US006448484B1

(12) United States Patent
Higgins

(10) Patent No.: US 6,448,484 B1
(45) Date of Patent: Sep. 10, 2002

(54) METHOD AND APPARATUS FOR PROCESSING DATA REPRESENTING A TIME HISTORY

(76) Inventor: Aaron J. Higgins, 12331 93rd Ave. NE., Kirkland, WA (US) 98034

( * ) Notice: Subject to any disclaimer, the term of this patent is extended or adjusted under 35 U.S.C. 154(b) by 0 days.

(21) Appl. No.: 09/722,062

(22) Filed: Nov. 24, 2000

(51) Int. Cl.[7] .................................................. G01H 7/00

(52) U.S. Cl. ............................ 84/604; 84/609; 84/622; 84/625; 84/649

(58) Field of Search ........................... 84/600–607, 609, 84/622–625, 649, 659–660, 477 R

(56) References Cited

U.S. PATENT DOCUMENTS 5,009,143 A * 4/1991 Knopp ........................ 84/604
5,614,687 A 3/1997 Yamada et al.
5,619,004 A * 4/1997 Dame .......................... 84/603
6,124,542 A * 9/2000 Wang .......................... 84/603
6,284,964 B1 * 9/2001 Suzuki et al. ................. 84/626
6,316,710 B1 * 11/2001 Lindemann .................. 84/609

* cited by examiner

*Primary Examiner*—Marlon T. Fletcher
(74) *Attorney, Agent, or Firm*—Robert M. Storwick

(57) ABSTRACT

A method and apparatus for processing data representing a time history of a sonic waveform. A portion of the data is processed to determine a beat frequency by performing a transformation from the time domain to the frequency domain and, based on the energy of the frequencies of the sonic waveform, produce an energy vector for each frequency band. The data is also processed to detect and order transients found in the sonic waveform and use these transients to establish the tempo of the sonic waveform.

20 Claims, 4 Drawing Sheets

METHOD AND APPARATUS FOR PROCESSING DATA REPRESENTING A TIME HISTORY

TECHNICAL FIELD

The present invention relates to methods and apparatus for processing data, and more particularly, to methods and apparatus for processing data representing a time history.

BACKGROUND OF THE INVENTION

Music programs that are produced from audio sources (especially digital sources, such as CDs and computer files) generally include a series of selections that are played in sequence without a break. As a consequence, it is desirable to make the transition from one selection to the next to be as smooth as possible so as not to draw the attention of those who are listening or dancing to the music.

Those music mixers who can accomplish such unnoticed transitions are in great demand because it requires a great deal of practice and technique. An important aspect of this talent is that the mixers can, in some way, match the beat of a first selection with the beat of the next selection, It is, therefore, desirable to have a method to process the data in a series of time histories so as to automate this process as well as possible. This is particularly desirable where the source of the time histories is a digital source of recorded music.

SUMMARY OF THE INVENTION

According to one aspect, the invention is a method for processing data representing a time history of a sonic waveform to create a plot of the energy contained in the sonic waveform as a function of time. The method includes the steps of: a) establishing a window that contains a portion of the time history of the sonic waveform, b) transforming the portion of the time history of the sonic waveform to a frequency domain, the frequency domain being divided into two or more frequency bands, c) determining phase and frequency vectors for each frequency band, d) combining the phase and frequency vectors to produce an energy vector for each frequency band and e) summing the energy vectors to create a single energy level for the window. The method also includes the steps of f) repeating steps a)–e) for different windows to completely cover the time history, and g) displaying the energy levels as a function of time.

According to another aspect, the invention is a method for processing data representing a time history of a sonic waveform to identify the largest transients contained in the sonic waveform as a function of time. The method includes the steps of a) establishing a window that contains a portion of the time history of the sonic waveform, b) transforming the portion of the time history of the sonic waveform to a frequency domain, the frequency domain being divided into two or more frequency bands, c) determining phase and frequency vectors for each frequency band, d) combining the phase and frequency vectors to produce an energy vector for each frequency band, and e) summing the energy vectors to create a single energy level for the window. The method also includes the steps of f) repeating steps a)–e) for different windows to completely cover the time history, g) displaying the energy levels as a function of time, and h) processing the energy levels to identify all portions of the displayed energy levels whose slopes exceed a predetermined value.

According to a still another aspect, the invention is a method for processing data representing a time history of a sonic waveform to identify a tempo contained in the sonic waveform as a function of time The method includes the steps of a) establishing a window that contains a portion of the time history of the sonic waveform, b) transforming the portion of the time history of the sonic waveform to a frequency domain, the frequency domain being divided into two or more frequency bands, c) determining phase and frequency vectors for each frequency band, d) combining the phase and frequency vectors Lo produce an energy vector for each frequency band, and e) summing the energy vectors to create a single energy level for the window. The method further includes the steps of f) repeating steps a)–e) for different windows to completely cover the time history, g) displaying the energy levels as a function of time, h) processing the energy levels to identify all portions of the displayed energy levels whose slopes exceed a predetermined value, and i) performing steps a)–h) until a predetermined number of transients has been identified, The method further includes the steps of j) ordering the transients as a function of their times of occurrence, k) comparing the ordered transients to each of a plurality of candidate tempos having an array of uniformly spaced pulses by establishing a small time interval around each of the pulses and determining the maximum number of pulses that appear within the time intervals as the array is varied in phase relative to the array; and 1) identifying as the tempo that tempo that produces the largest maximum number of pulses that appear within the time intervals corresponding to that tempo.

According for yet another aspect, the invention is a method for processing data representing a time history of a sonic waveform to detect aliasing in the data. The method includes the steps of a) establishing a window that contains a portion of the time history of the sonic waveform, b) transforming the portion of the time history of the sonic waveform to a frequency domain, the frequency domain being divided into two or more frequency bands, c) determining phase and frequency vectors for each frequency band, d) combining the phase and frequency vectors to produce an energy vector for each frequency band, and e) summing the energy vectors to create a single energy level for the window. The inventive method also includes the steps of f) repeating steps a)–e) for different windows to completely cover the time history, g) displaying the energy levels as a function of time, and h) processing the energy levels to identify all portions of the displayed energy levels whose slopes exceed a predetermined value. The method further includes the steps of i) performing steps a)–h) until a predetermined number of transients has been identified, j) ordering the transients as a function of their times of occurrence, k) comparing the ordered transients to each of a plurality of candidate tempos having an array of uniformly spaced pulses by establishing a small time interval around each of the pulses and determining the maximum number of pulses that appear within the time intervals as the array is varied in phase relative to the array, 1) identifying as the tempo that tempo that produces the largest maximum number of pulses that appear within the time intervals corresponding to that tempo, m) establishing a plurality of bins having predetermined sizes and predetermined spacings, and n) analyzing the identified portions in accordance with the bins to determine whether the identified tempo is in error.

According the a still further aspect the invention is a method for processing data representing a time history of a sonic waveform to a beat map for the sonic waveform as a function of time. The method includes the steps of a) establishing a window that contains a portion of the time history of the sonic waveform, b) transforming the portion of the time history of the sonic waveform to a frequency domain, the frequency domain being divided into two or more frequency bands, c) determining phase and frequency vectors for each frequency band, d) combining the phase and frequency vectors 1o produce an energy vector for each frequency band, and e) summing the energy vectors to create a single energy level for the window. The method also includes the steps of f) repeating steps a)–e) for different windows to completely cover the time history, g) displaying the energy levels as a function of time, h) processing the energy levels to identify all portions of the displayed energy levels whose slopes exceed a predetermined value, and i) performing steps a)–h) until a predetermined number of transients has been identified. The method further includes the steps of j) ordering the transients as a function of their times of occurrence, k) comparing the ordered transients to each of a plurality of candidate tempos having an array of uniformly spaced pulses by establishing a small time interval around each of the pulses and determining the maximum number of pulses that appear within the time intervals as the array is varied in phase relative to the array, 1) identifying as the tempo that tempo that produces the largest maximum number of pulses that appear within the time intervals corresponding to that tempo, and m) creating a list of pulses that Correspond to actual beat positions. The method further includes the steps of n) determining the number of pulses on the list of pulses that pass through a mask having openings spaced in accordance with the tempo, o) comparing the number of pulses to a predetermined threshold and marking as valid the pulses that pass through the mask, and p) interpolating pulses at beat intervals between the valid pulses and producing an array of beat positions therefrom.

According to yet another aspect, the invention is an apparatus for processing data representing a time history of a sonic waveform to create a plot of the energy contained in the sonic waveform as a function of time, comprising means for establishing a window that contains a portion of the time history of the sonic waveform, means for transforming the portion of the time history of the sonic waveform to a frequency domain, the frequency domain being divided into two or more frequency bands, means for determining phase and frequency vectors for each frequency band, means for combining the phase and frequency vectors to produce an energy vector for each frequency band, and means for summing the energy vectors to create a single energy level for the window. The apparatus further includes means for providing the means above with data filtered through different windows to completely cover the time history, and means for displaying the energy levels as a function of time, According to still another aspect, the invention is an apparatus for processing data representing a time history of a sonic waveform to identify the largest transients contained in the sonic waveform as a function of time. The apparatus includes means for establishing a window that contains a portion of the time history of the sonic waveform, means for transforming the portion of the time history of the sonic waveform to a frequency domain, the frequency domain being divided into two or more frequency bands, means for determining phase and frequency vectors for each frequency band, means for combining the phase and frequency vectors to produce an energy vector for each frequency band, and means for summing the energy vectors to create a single energy level for the window. The apparatus also includes means for providing the means above with data filtered through different windows to completely cover the time history, means for displaying the energy levels as a function of time, and means for processing the energy levels to identify all portions of the displayed energy levels whose slopes exceed a predetermined value.

According to a still further aspect, the invention is an apparatus for processing data representing a time history of a sonic waveform to identify a tempo contained in the sonic waveform as a function of time. The apparatus includes means for establishing a window that contains a portion of the time history of the sonic waveform, means for transforming the portion of the time history of the sonic waveform to a frequency domain, the frequency domain being divided into two or more frequency bands, means for determining phase and frequency vectors for each frequency band, means for combining the phase and frequency vectors to produce an energy vector for each frequency band, and means for summing the energy vectors to create a single energy level for the window. The apparatus also includes means for providing the means above with data filtered through different windows to completely cover the time history, means for displaying the energy levels as a function of time, and means for processing the energy levels to identify all portions of the displayed energy levels whose slopes exceed a predetermined value. Further, the apparatus includes means for providing the means above with data until a predetermined number of transients has been identified, means for ordering the transients as a function of their times of occurrence, means for comparing the ordered transients to each of a plurality of candidate tempos having an array of uniformly spaced pulses by establishing a small time interval around each of the pulses and determining the maximum number of pulses that appear within the time intervals as the array is varied in phase relative to the array and means for identifying as the tempo that tempo that produces the largest maximum number of pulses that appear within the time intervals corresponding to that tempo.

According to another aspect, the invention is an apparatus for processing data representing a time history of a sonic waveform to detect aliasing in the data, The apparatus includes means for establishing a window that contains a portion of the time history of the sonic waveform, means for transforming the portion of the time history of the sonic waveform to a frequency domain, the frequency domain being divided into two or more frequency bands, means, for determining phase and frequency vectors for each frequency band, means for combining the phase and frequency vectors to produce an energy vector for each frequency band, and means for summing the energy vectors to create a single energy level for the window. The apparatus also includes means for providing the means above with data filtered through different windows to completely cover the time history, means for displaying the energy levels as El function of time, and means for processing the energy levels to identify all portions of the displayed energy levels whose slopes exceed a predetermined value. The apparatus also includes means for providing the means above with data until a predetermined number of transients has been identified, means for ordering the transients as a function of their times of occurrence, means for comparing the ordered transients to each of a plurality of candidate tempos having an array of uniformly spaced pulses by establishing a small time interval around each of the pulses and determining the maximum number of pulses that appear within the time intervals as the array is varied in phase relative to the array, means for identifying as the tempo that tempo that produces the largest maximum number of pulses that appear within the time intervals corresponding to that tempo, means for establishing a plurality of bins having predetermined sizes and predetermined spacings, and means for analyzing the identified portions in accordance with the bins to determine whether the identified tempo is in error According to still another aspect, the invention is an apparatus for processing data representing a time history of a sonic waveform to a beat map for the sonic waveform as a function of time. The apparatus includes means for establishing a window that contains a portion of the time history of the sonic waveform, means for transforming the portion of the time history of the sonic waveform to a frequency domain, the frequency domain being divided into two or more frequency bands, means for determining phase and frequency vectors for each frequency band, means for combining the phase and frequency vectors to produce an energy vector for each frecqency band, and means for summing the energy vectors to create a single energy level for the window. The apparatus also includes means for providing the means above with data filtered through different windows to completely cover the time history, and means for displaying the energy levels as a function of time. The apparatus further includes means for processing the energy levels to identify all portions of the displayed energy levels whose slopes exceed a predetermined value, means for providing the means above with data until a predetermined number of transients has been identified, means for ordering the transients as a function of their times of occurrence, means for comparing the ordered transients to each of a plurality of candidate tempos having an array of uniformly spaced pulses by establishing a small time interval around each of the pulses and determining the maximum number of pulses that appear within the time intervals as the array is varied in phase relative to the array, and means for identifying as the tempo that tempo that produces the largest maximum number of pulses that appear within the time intervals corresponding to that tempo. The apparatus still further includes means for creating a list of pulses that correspond to actual beat positions, means for determining the number of pulses on the list of pulses that pass through a mask having openings spaced in accordance with the tempo, means for comparing the number of pulses to a predetermined threshold and marking as valid the pulses that pass through the mask, and means for interpolating pulses at beat intervals between the valid pulses and producing an array of beat positions therefrom.

DETAILED DESCRIPTION OF THE PREFERRED EMBODIMENT OF THE INVENTION

Figure 1:
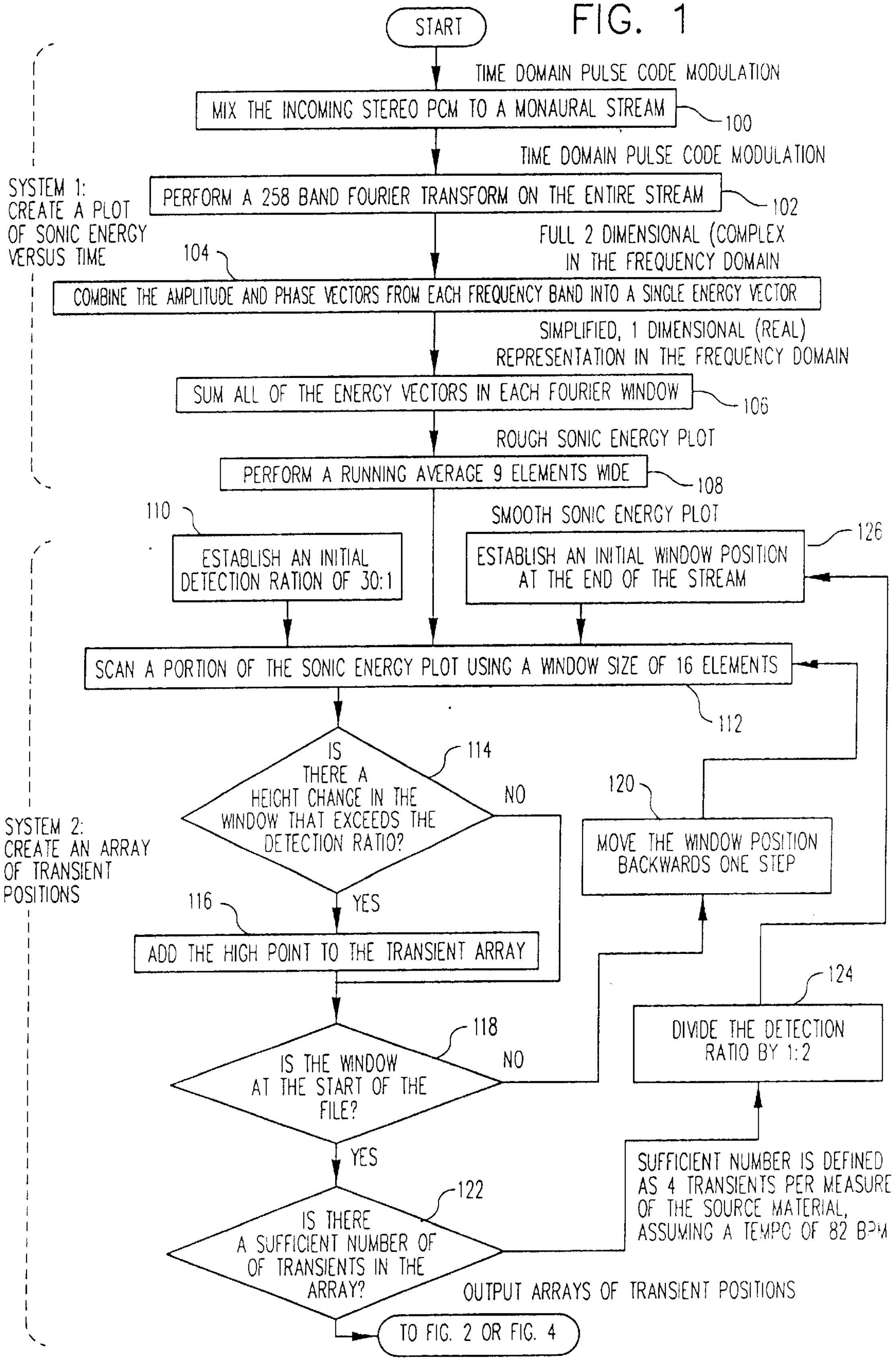
FIGS. 1–4 together compose a flow chart of the preferred methods of the invention.

FIGS. 1–4 together compose a flow chart of the preferred methods of the invention. According to FIG. 1, the preferred methods of the invention begin by operating on the time domain pulse code modulations (PCMS) that represent a time history of a sonic waveform as a function of time. Incoming stereo PCMs are mixed to produce a monaural stream of data (block 100) as would be known by those skilled in the relevant arts. A 256 band Fourier transform is then performed on the entire stream (block 102), to produce a full 2-dimensional (complex) representation in the frequency domain. Amplitude and phase vectors from each frequency band are combined into a simple energy vector (block 104), which is a simplified 1-dimensional real representation of the data in the frequency domain. Next, all of the energy vectors in each Fourier window are summed (block 106), producing a rough sonic energy plot. A running average of the data, 9 elements wide is computed (block 108), producing a smooth sonic energy plot. The steps represented by blocks 100–108 constitute a first method, in accordance with the present invention, to create a plot of sonic energy versus time.

Next, an initial detection ratio of 30:1 is established (block 110), and a portion of the sonic energy plot is scanned, using a window size of 16 elements (block 112) In decision block 114, it is determined whether there is a height change in the present window that exceeds the current detection ratio. If there is, the highest point is added to a transient array (block 116), and the method proceeds to decision block 118. Otherwise, the method proceeds directly to decision block 118.

Decision block 118 determines whether the current window is located at the start of the file. If not, the method moves the current window backward one step (block 120) and returns to block 112. Otherwise, the method passes to decision block 122, where the method determines whether there is a sufficient number of transients in the array. (According to the preferred embodiment, a sufficient number is defined as four transients per measure of the source materials, assuming a tempo of 82 beats per minute. Those skilled in the relevant arts will know how to define a sufficient number for different: circumstances.) If there is not a sufficient number of transients in the array, the detection ratio is divided by 1.2 (block 124), the method establishes an initial window position at the end of the stream (block 126) and the method returns to block 112. Otherwise, the method moves to the steps shown in the portion of the flow chart contained in FIG. 2. The steps represented by blocks 110–124 constitute a second method, in accordance with the present invention, to create an array of transient positions. At this point, the method has established output arrays of transient positions.

Figure 2:
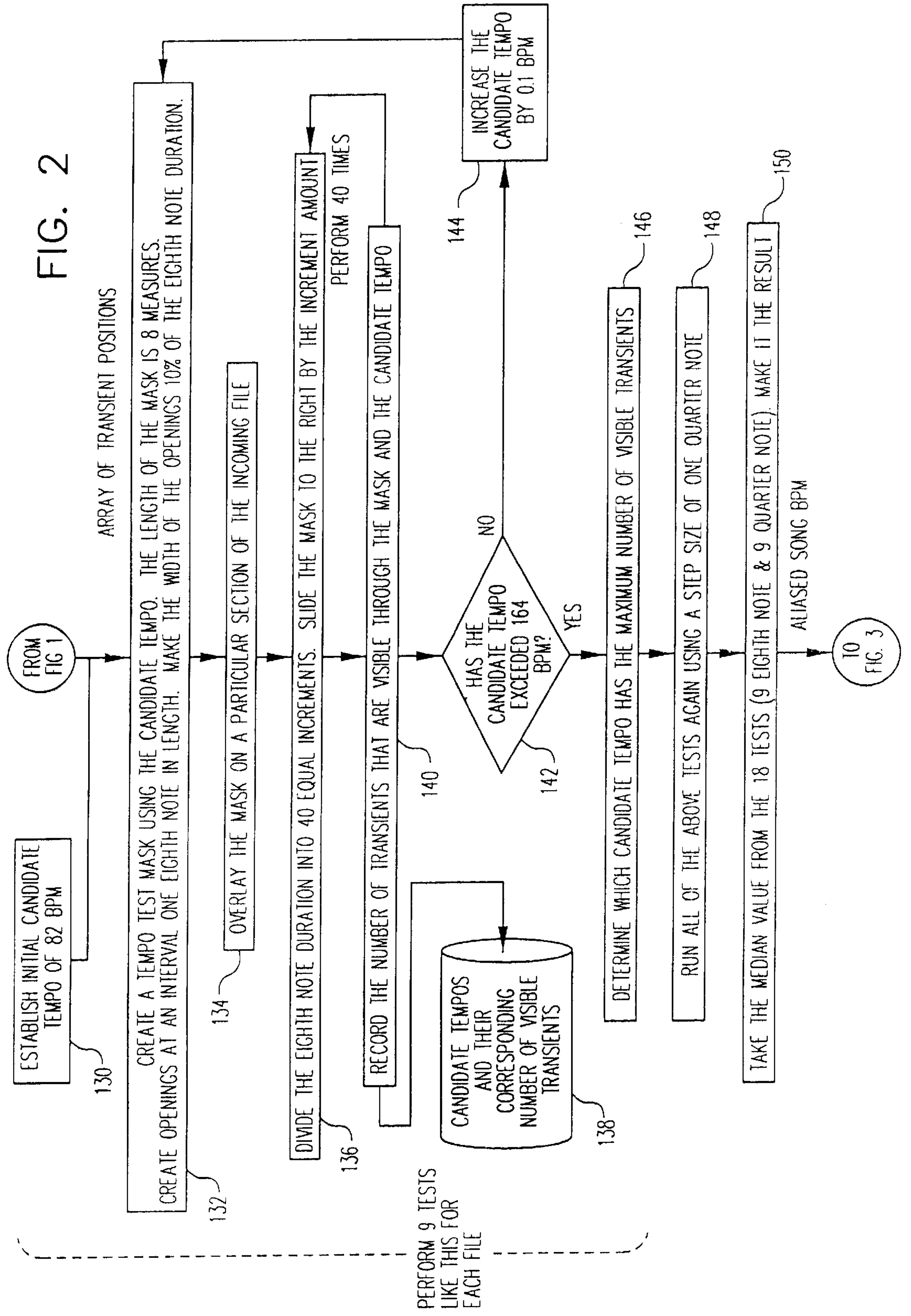

As shown in FIG. 2, the method establishes an initial candidate tempo of 82 beats per minute (BPM) (block 130). From this point the method operates on an array of transient positions. The method creates EL tempo test mask using the candidate tempo (block 132). The length of the mask is 8 measures. Openings are created in the mask at intervals one eighth note apart. The widths of the openings are 10 percent of the eighth note separation The mask created is overlaid on a particular section of the incoming file to be analyzed (block 134). The eighth note duration is divided into forty equal increments and the mask is slid to the right (i.e., later time) in the file by the increment amount (block 136). The number of transients that are visible through the mask and the candidate tempo is recorded on storage device 138 (block 140), and the method returns to block 136, which is performed a total of forty times before passing to decision block 142. In decision block 142, the method determines whether the candidate tempo has exceeded 164 BPM. If it hasn't, the method increases the candidate tempo by 0.1 BPM (block 144) and returns to block 132. Otherwise, the method moves to block 146, where it determines (from the data recorded on storage device 138) which candidate tempo has: the maximum number of transients that are visible through the mask. Then the method performs the steps indicated by block 130–146 except that the mask created in block 132 is based on quarter note durations (block 148), The method performs the steps of blocks 130–148 nine times for each file. The method then determines the result of the process of nine performances of the blocks 130–148 (i.e., 18 tests) by taking the median value of the tempos (block 150). The result is the aliased song BPM value.

Figure 3:
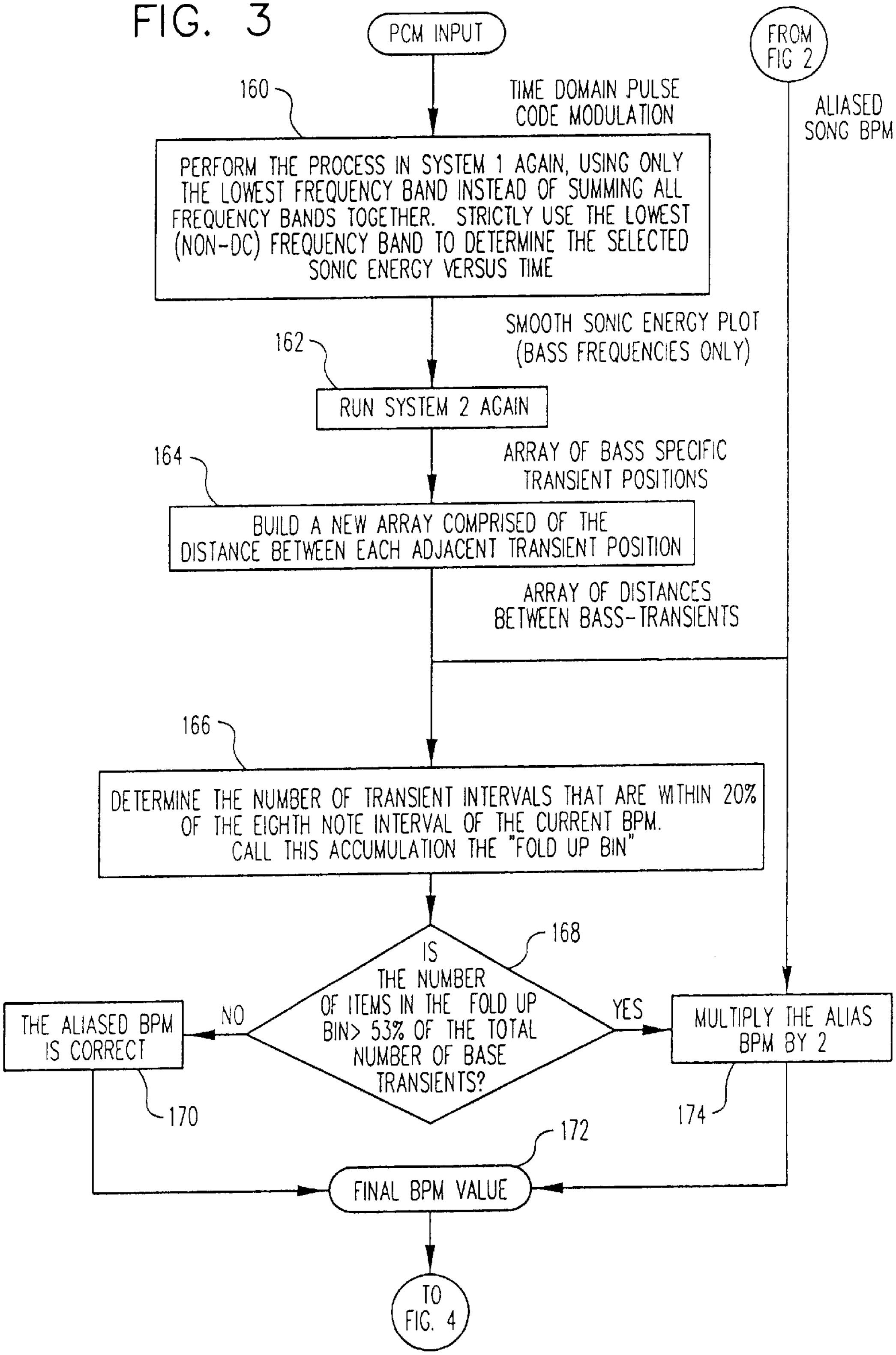
Figure 4:
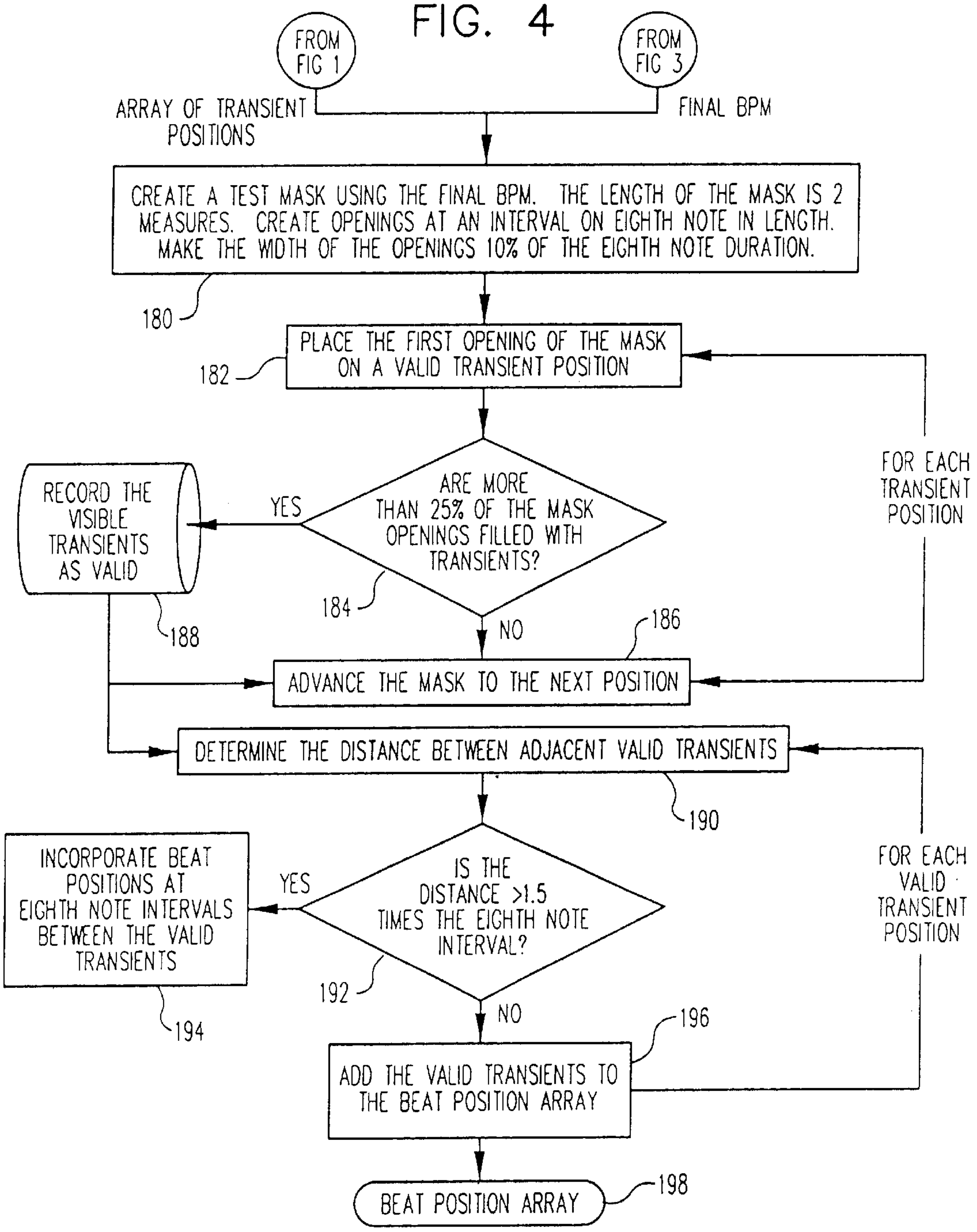

Next, the method moves to the steps shown in the portion of the flow chart contained in FIG. 3, where the final RPM value is determined. The input to the method starting on FIG. 3 is the time domain pulse code modulation on which the steps shown in blocks 100–108 are initially performed. However, in block 160, where the steps in blocks 100–108 are again performed, only the lowest frequency (non-DC) band is used, instead of summing all frequency bands together. This produces a smooth sonic energy plot. The steps of blocks 110–122 are again performed on the resulting smooth sonic energy plot (block 162) to produce an array of bass-specific transient positions. Next, an array including the distances between each adjacent transient position is created (block 164). From this array, and using the aliased song SPM produced by the portion of the method shown in FIG. 2, the number of transient intervals that are within 20% of the eighth note interval of the current BPM is determined (block 166). This accumulation is tensed the "fold up bin".

The method then moves to decision block 168 where the method determines whether the number of items in the fold up bin is greater than 53% of, the total number of base transients. It the number of items in the fold up bin is not greater than 53% of the total number of base transients, the method determines that the aliased BPM is correct (block 170) and establishes that BPM as the final BPM value (block 172). If, however, the number of items in the fold up bin is greater than 53% of the total number of base transients, the method multiplies the aliased SPM from FIG. 2 by two (block 174) and. establishes that BPM as the final BPM value (block 172). The method then moves to the portion of the flow chart shown in FIG. 4.

In FIG. 5, the method uses the array of transient positions produced in FIG. 1 and the final BPM produced in FIG. 3. The method creates a test mask using the final BPM (block 180) The length of the mask is 2 measures, Openings in the mask are created at intervals of one eighth note. The width of the openings is 10% of the eighth note duration. The method then places the first opening of the mask on a valid transient position (block 182) and passes on to decision:n block 184. At decision block 184 the method determines whether there are more than 25% of the mask openings filled with transients. If there are fewer than 25%, of the mask openings filled with transients, the method advances the mask to the next position (block 186) and returns to block 182. If more than 25% of the mask openings filled with transients, the method records the visible transients as valid (block 188), advances the mask to the next position, and returns to block 182, The method performs this operation for each transient position. After this check has been made for each transient position, the method moves to block 190, where it determines the distance between adjacent valid transients. The method then check to determine whether the distance between adjacent valid transients is greater than 1.5 times the eighth note interval (block 192). If the distance between adjacent valid transients is greater than 1.5 times the eighth note interval, the method interpolates the best positions at eighth note intervals, between the valid transients (block 194), and then adds the valid transients to the beat position array (block 196). If the distance between adjacent valid transients is less than 1.5 times the eighth note interval, the method adds the valid transients to the beat position array (block 196). The method performs this operation for each valid transient position. After performing for each valid transient position, the method ends, having produced the desired beat position array (block 198).

The method can be performed on a conventional personal computer (PC), including a CPU, a memory, a hard drive storage device, a mass input device (such as a removable disk drive), a keyboard, a monitor, and possibly an output device such as a printer. The typical PC operates under the Windows operating system and can be configured to perform the steps of the method under the control of a program that is stored in an electronic memory that is part of a conventional PC. As a result, the programmed PC can be considered as an apparatus including a series of electronic circuits that perform the steps of the method of the invention.

While the foregoing is a detailed description of the preferred embodiment of the invention, there are many alternative embodiments of the invention that would occur to those skilled in the art and which are within the scope of the present invention Accordingly, the present invention is to be determined by the following claims.

What is claimed is:

1. A method for processing data representing a time history of a sonic waveform to create a plot of the energy contained in the sonic waveform as a function of time, comprising the steps of:

a) establishing a window that contains a portion of the time history of the sonic waveform;

b) transforming the portion of the time history of the sonic waveform to a frequency domain, the frequency domain being divided into two or more frequency bands;

c) determining phase and frequency vectors for each frequency band;

d) combining the phase and frequency vectors to produce an energy vector for each frequency band;

e) summing the energy vectors to create a single energy level for the window;

f) repeating steps a)–e) for different windows to completely cover the time history; and g) displaying the energy levels as a function of time.

2. The method of claim 1, wherein step b) includes transforming the portion of the time history of the sonic waveform according to the Fourier transform.

3. The method of claim 1, further including the step of h) generating a running average of the energy levels as a function of time.

4. A method for processing data representing a time history of a sonic waveform to identify the largest transients contained in the sonic waveform as a function of time, comprising the steps of:

a) establishing a window that contains a portion of the time history of the sonic waveform;

b) transforming the portion of the time history of the sonic waveform to a frequency domain, the frequency domain being divided into two or more frequency bands;

c) determining phase and frequency vectors for each frequency band;

d) combining the phase and frequency vectors to produce an energy vector for each frequency band;

e) summing the energy vectors to create a single energy level for the window;

f) repeating steps a)–e) for different windows to completely cover the time history;

g) displaying the energy levels as a function of time; and h) processing the energy levels to identify all portions of the displayed energy levels whose slopes exceed a predetermined value.

5. The method of claim 4, wherein step h) further includes identifying the average energy within an averaging window containing the portion of the sonic waveform being analyzed, and establishing the predetermined value in accordandt with the average energy.

6. The method of claim 4, further including the steps of:

i) performing steps a)–h) until a predetermined number of transients has been identified; and j) ordering the transients as a function of their times of occurrence.

7. A method for Processing data representing a time history of a sonic waveform to identify a tempo contained in the sonic waveform as a function of time, comprising the steps of:

a) establishing a window that contains a portion of the time history of the sonic waveform;

b) transforming the portion of the time history of the sonic waveform to a frequency domain, the frequency domain being divided into two or more frequency bands;

c) determining phase and frequency vectors for each frequency band;

d) combining the phase and frequency vectors to produce an energy vector for each frequency band;

e) summing the energy vectors to create a single energy level for the window;

f) repeating steps a)–e) for different windows to completely cover the time history;

g) displaying the energy levels as a function of time;

h) processing the energy levels to identify all portions of the displayed energy levels whose slopes exceed a predetermined value;

i) performing steps a)–h) until a predetermined number of transients has been identified;

j) ordering the transients as a function of their times of occurrence;

k) comparing the ordered transients to each of a plurality of candidate tempos having an array of uniformly spaced pulses by establishing a small time interval around each of the pulses and determining the maximum number of pulses that appear within the time intervals as the array is varied in phase relative to the array; and l) identifying as the tempo that tempo that produces the largest maximum number of pulses that appear within the time intervals corresponding to that tempo.

8. The method of claim 7, further including the step of:

m) performing steps a)–l) on a variety of portions of the time history of the sonic waveform; and n) identifying the median value of the identified tempos as the tempo of the time history of the sonic waveform.

9. A method for processing data representing a time history of a sonic waveform to detect aliasing in the data, comprising the steps of:

a) establishing a window that contains a portion of the time history of the sonic waveform;

b) transforming the portion of the time history of the sonic waveform to a frequency domain, the frequency domain being divided into two or more frequency band;

c) determining phase and frequency vectors for each frequency band;

d)combining the phase and frequency vectors to produce an energy vector for each frequency bandit e) summing the energy vectors to create a single energy level for the window;

f) repeating steps a)–e) for different windows to completely cover the time history;

g) displaying the energy levels as a function of time;

h) processing the energy levels to identify all portions of the displayed energy levels whose slopes exceed a predetermined value;

i) performing steps a)–h) until a predetermined number of transients has been identified;

j) ordering the transients as a function of their times of occurrence;

k) comparing the ordered transients to each of a plurality of candidate tempos having an array of uniformly spaced pulses by establishing a small time interval around each of the pulses and determining the maximum number of pulses that appear within the time intervals as the array is varied in phase relative to the array;

l) identifying as the tempo that tempo that produces the largest maximum number of pulses that appear within the time intervals corresponding to that tempo;

m) establishing a plurality of bins having predetermined sizes and predetermined spacings; and n) analyzing the identified portions in accordance with the bins to determine whether the identified tempo is in error.

10. A method for processing data representing a time history of a sonic waveform to a beat map for the sonic waveform as a function of time, comprising the steps of:

a) establishing a window that contains a portion of the time history of the sonic waveform;

b) transforming the portion of the time history of the sonic waveform to a frequency domain, the frequency domain being divided into two or more frequency bands;

c) determining phase and frequency vectors for each frequency band;

d) combining the phase and frequency vectors to produce an energy vector for each frequency band;

e) summing the energy vectors to create a single energy level for the window;

f) repeating steps a)–e) for different windows to completely cover the time history;

g) displaying the energy levels as a function of time;

h) processing the energy levels to identify all portions of the displayed energy levels whose slopes exceed a predetermined value;

i) performing steps a)–h) until a predetermined number of transients has been identified;

j) ordering the transients as a function of their times of occurrence;

k) comparing the ordered transients to each of a plurality of candidate tempos having an array of uniformly spaced pulses by establishing a small time interval around each of the pulses and determining the maximum number of pulses that appear within the time intervals as the array is varied in phase relative to the array;

l) identifying as the tempo that tempo that produces the largest miaximnum number of pulses that appear within the time intervals corresponding to that tempo;

m) creating a list of pulses that correspond to actual beat positions;

n) determining the number of pulses on the list of pulses that pass through a mask having openings spaced in accordance with the tempo;

o) comparing the number of pulses to a predetermined threshold and marking as valid the pulses that pass through the mask; and p) interpolating pulses at beat intervals between the valid pulses and producing an array of beat positions therefrom.

11. An apparatus for processing data representing a time history of a sonic waveform to create a plot of the energy contained in the sonic waveform aids a function of time, comprising:

means for establishing a window that contains a portion of the time history of the sonic waveform;

means for transforming the portion of the time history of the sonic waveform to a frequency domain, the frequency domain being divided into two or more frequency bands;

means for determining phase and frequency vectors for each frequency band;

means for combining the phase and frequency vectors to produce an energy vector for each frequency band;

means for summing the energy vectors to create a single energy level for the window;

means for providing the means above with data filtered through different windows to completely cover the time history; and means for displaying the energy levels as a function of time.

12. The apparatus of claim 11, wherein the means for transforming includes means for transforming the portion of the time history of the sonic waveform according to the Fourier transform.

13. The apparatus of claim 11, further including means for generating a running average of the energy levels as a function of time.

14. An apparatus for processing data representing a time history of a sonic waveform to identify the largest transients contained in the sonic waveform as a function of time, comprising:

means for establishing a window that contains a portion of the time history of the sonic waveform;

means for transforming the portion of the time history of the sonic waveform to a frequency domain, the frequency domain being divided into two or more frequency bands;

means for determining phase and frequency vectors for each frequency band;

means for combining the phase and frequency vectors to produce an energy vector for each frequency band;

means for summing the energy vectors to create a single energy level for the window;

means for providing the means above with data filtered through different windows to completely cover the time history;

means for displaying the energy levels as a function of time; and means for Processing the energy levels to identify all portions of the displayed energy levels whose slopes exceed a predetermined value.

15. The apparatus of claim 14, wherein the means for processing further includes means for identifying the average energy within an averaging window containing the portion of the sonic waveform being analyzed, and for establishing the predetermined value in accordance with the average energy.

16. The apparatus of claim 14, further including:

means for providing the means above with data until a predetermined number of transients has been identified; and means for ordering the transients as a function of their times of occurrence.

17. An apparatus for processing data representing a time history of a sonic waveform to identify a tempo contained in the sonic waveform as a function of time, comprising:

means for establishing a window that contains a portion of the time history of the sonic waveform;

means for transforming the portion of the time history of the sonic waveform to a freqency domain, the frequency domain being divided into two or more frequency bands;

means for determining phase and frequency vectors for each frequency band;

means for combining the phase and frequency vectors to produce an energy victor for each frequency band;

means for summing the energy vectors to create a single energy level for the window;

means for providing the means above with data filtered through different windows to completely cover the time history;

means for displaying the energy levels as a function of time;

means for processing the energy levels to identify all portions of the displayed energy levels whose slopes exceed a predetermined value;

means for providing the means above with data until a predetermined number of transients has been identified;

means for ordering the transients as a function of their times of occurrence;

means for comparing the ordered transients to each DE a plurality of candidate tempos having an array of uniformly spaced pulses by establishing a small time interval around each of the pulses and determining the maximum number of pulses that appear within the time intervals as the array is varied in phase relative to the array; and means for identifying as the tempo that tempo that produces the largest maximum number of pulses that appear within the time intervals corresponding to that tempo.

18. The apparatus of claim 17, further including:

means for providing the means in claim 17 with data from a variety of portions of the time history of the sonic waveform; and means for identifying the median value of the identified tempos as the tempo of the time history of the sonic waveform.

19. An apparatus for processing data representing a time history of a sonic waveform to detect aliasing in the data, comprising:

means for establishing a window that contains a portion of the time history of the sonic waveform;

means for transforming the portion of the time history of the sonic waveform to a frequency domain, the frequency domain being divided into two or more frequency bands;

means for determining phase and frequency vectors for each frequency band;

means for combining the phase and frequency vectors to produce an energy vector for each frequency band;

means for summing the energy vectors to create a single energy level for the window;

means for providing the means above with data filtered through different windows to completely cover the time history;

means for displaying the energy levels as a function of time;

means for processing the energy levels to identify all portions of the displayed energy levels whose slopes exceed a predetermined value;

means for providing the means above with data until a predetermined number of transients has been identified;

means for ordering the transients as a function of their times of occurrence;

means for comparing the ordered transients to each of a plurality of candidate tempos having an array of uniformly spaced pulses by establishing a small time interval around each of the pulses and determining the maximum number of pulses that appear within the time intervals as the array is varied in phase relative to the array;

means for identifying as the tempo that tempo that produces the largest maximum number of pulses that appear within the time intervals corresponding to that tempo;

means for establishing a plurality of bins having predetermined sizes and predetermined spacings; and means for analyzing the identified portions in accordance with the bins to determine whether the identified tempo is in error.

20. An apparatus for processing data representing a time history of a sonic waveform to a beat map for the sonic waveform as a function of time, comprising:

means for establishing a window that contains a portion of the time history of the sonic waveform;

means for transforming the portion or the time history of the sonic waveform to a frequency domain, the frequency domain being divided into two or more frequency bands;

means for determining phase and frequency vectors for each frequency band;

means for combining the phase and frequency vectors to produce an energy vector for each frequency band;

means for summing the energy vectors to create a single energy level for the window;

means for providing the means above with data filtered through different windows to completely cover the time history;

means for displaying the energy levels as a function of time;

means for processing the energy levels to identify all portions of the displayed energy levels whose slopes exceed a predetermined value;

means for providing the means above with data until a predetermined number of transients has been identified;

means for ordering the transients as a function of their times of occurrence;

means for compairing the ordered transients to each of a plurality of candidate tempos having an array of uniformly spaced pulses by establishing a small time interval around each of the pulses and determining the maximum number of pulses that appear within the time intervals as the array is varied in phase relative to the array;

means for identifying as the tempo that tempo that produces the largest maximum number of pulses that appear within the time intervals corresponding to that tempo;

means for creating a list of pulses that correspond to actual beat positions; means for determining the number of pulses on the list of pulses that pass through a mask having openings spaced in accordance with the tempo;

means for comparing the number of pulses to a predetermined threshold and marking as valid the pulses that pass through the mask; and means for interpolating pulses at beat intervals between the valid pulses and producing an array of beat positions therefrom.

* * * * *